June 5, 1934.  A. L. LEE  1,961,370
CUTTER CHAIN
Filed April 8, 1933  2 Sheets-Sheet 1
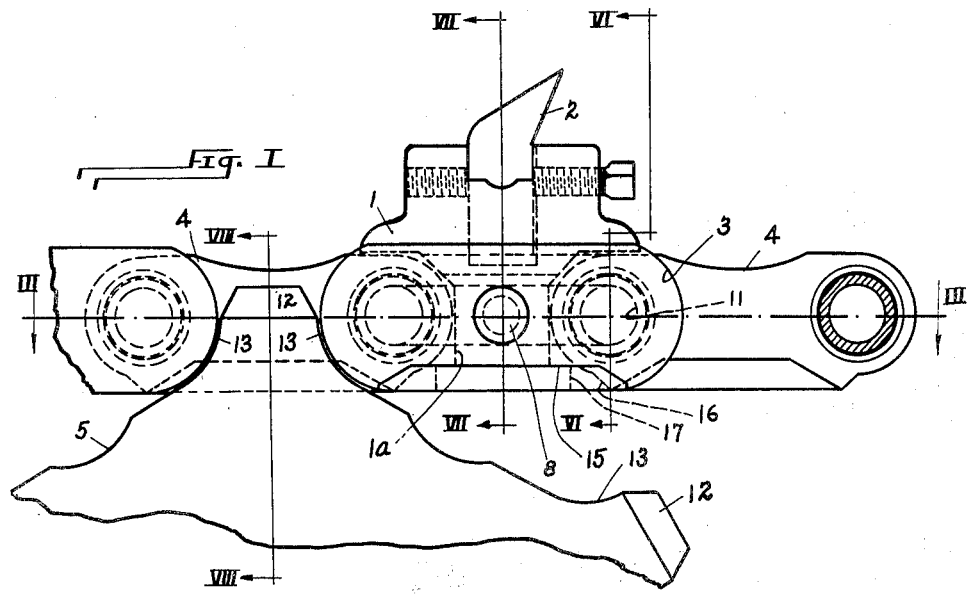
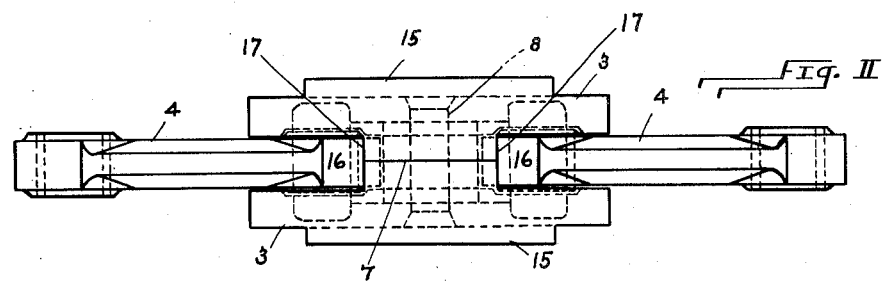
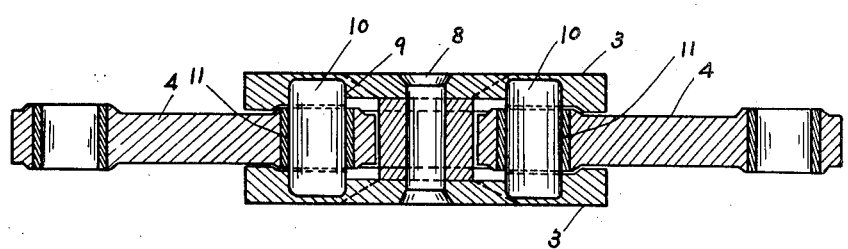
INVENTOR
Arthur L. Lee
by Christy Christy and Wharton
his attorneys June 5, 1934.  A. L. LEE  1,961,370
CUTTER CHAIN
Filed April 8, 1933  2 Sheets-Sheet 2
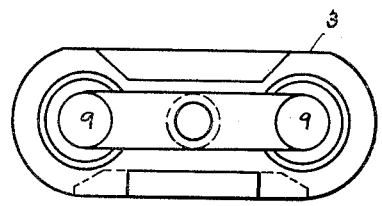
Fig. IV
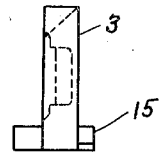
Fig. V
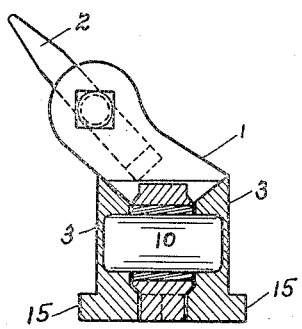
Fig. VI
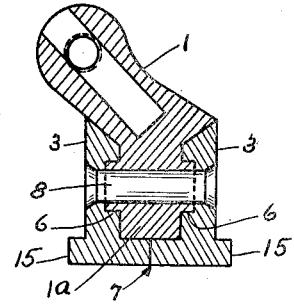
Fig. VII
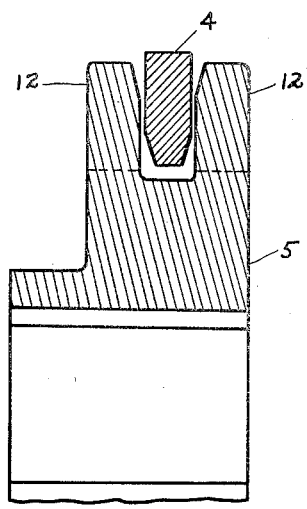
Fig. VIII
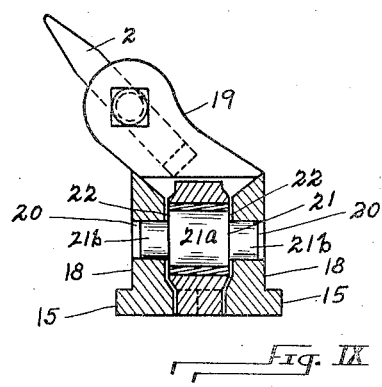
Fig. IX
INVENTOR
Arthur L Lee
by Christy Christy and Wharton
his attorneys Patented June 5, 1934

1,961,370

UNITED STATES PATENT OFFICE 1,961,370

CUTTER CHAIN

Arthur L. Lee, Gibsonia, Pa.

Application April 8, 1933, Serial No. 665,149

11 Claims. (Cl. 262—33)

This invention relates to a cutter chain for use in mining machinery.

As universally made, cutter chains consist of bit-carrying elements comprising a link and a bit-block, and connecting links pivotally interconnecting the links of the bit-carrying elements.

An object of my invention is to provide bit-carrying elements of such structure that their pivotal connection to the connecting links is not by means of rivets, but may be by means of suitably hardened pins better able to endure the stresses and wear of service.

Another object of my invention is to so construct the bit-carrying element of the cutter chain, and so arrange the cooperating parts, that the parts subjected to the stress and wear of driving the chain are individually renewable.

A further object of my invention is to obtain the above-noted advantages in a cutter chain which is simple and sturdy, and which presents no unusual manufacturing problems.

In the accompanying drawings Figure I is a side elevation of one bit-carrying assembly of the cutter chain, and two connecting links therefor, showing the sprocket for driving the chain in fragmentary elevation; Figure II is a bottom plan view of the structure shown in Figure I; Figure III is a horizontal sectional view taken on the line III—III of Figure I; Figure IV is an inside elevation of one of the individual side straps of the bit-carrying assembly shown in the preceding figures of the drawings; Figure V is an end elevation of one of the individual side straps; Figure VI is a cross-sectional view taken on the line VI—VI of Figure I; Figure VII is a cross-sectional view taken on the line VII—VII of Figure I; Figure VIII is a cross-sectional view through the chain and its associated sprocket taken on the line VIII—VIII of Figure I; and Figure IX is a cross-sectional view similar to Figure VI, but illustrating a modification in structure.

In the drawings reference numeral 1 designates the bit-block of the bit-carrying assembly, and reference numeral 2, the bit carried thereby. As will be more fully explained, the bit-block is embraced by a pair of side straps 3, which have pivotal engagement with connecting links 4. The chain is driven by a sprocket 5.

By reference to the drawing it will be seen that bit-block 1 comprises an upper portion adapted to receive and support the bit 2, and a lower portion 1a adapted to interlock and be connected with the two side straps 3. The interlocking engagement of the bit-block and side straps, as shown particularly in Figure VII of the drawings, is effected by means of square-sided ribs 6 on the portion 1a of the bit-block, which match with similarly shaped sockets in the side straps. The side straps 3 are in mutual contact beneath the bit-block, as indicated at 7, Figure VII, so that the two side straps provide a three-sided chamber in which the bit-block has an interlocking engagement.

Matching holes are formed in the two side straps 3 and the lower portion 1a of the bit-block, to receive a rivet 8 for positively interconnecting these members. In this position a rivet is not disadvantageously used, since there are no substantial stresses tending to pull the side straps laterally from the bit-block, and any tendency toward vertical, or longitudinal, separation is nullified by the interlocking engagement of the bit-block and the side straps. There are, therefore, no substantial shearing stresses on the rivet 8.

The interconnection between the bit-block and the two side straps being in the longitudinally medium region of the side straps, the terminal portions of the side straps, which extend beyond the lower portion 1a of the bit-block, provide a free space of considerable depth for the attachment of the connecting links 4 to the bit-carrying assembly. The terminal of each of the connecting links is therefore adapted to enter between the side straps of a bit-carrying assembly for pivotal engagement thereto.

To provide pivotal engagement in the bit-carrying assembly for the connecting links each of the side straps is recessed adjacent each of its terminals, so that the matching of recesses in the co-operating side straps provides a pair of chambers 9 defined wholly within the bodies of the side straps. Each of the chambers 9 serves to confine a pin 10, which is held in position merely by its confinement in the chamber. These pins 10 may therefore be made of special steel, and may be hardened in any suitable manner, since it is unnecessary that the pin be provided with threads or other engaging means, or that it be upset as a rivet in order to fasten it in the bit-carrying assembly. The bit-carrying assembly or element is thus pivotally associated with a connecting link at each end of the assembly by means of the engagement of an eye 11 in the connecting link with a pin 10 lying in the chamber 9 defined by the two side straps.

The sprocket 5, driving the chain, is formed with a double row of laterally spaced teeth 12, which straddle the connecting links 4, and have curved faces 13 co-operating with similarly curved faces at the end of the side straps. Thus one tooth 12 of each co-operating pair on the sprocket 5 bears against one of the co-operating pair of side straps in the bit-carrying assembly. The gibs, or flanges, for engaging the chain to the cutter bar are formed at the lower end of the side straps, as flanges 15, and no gibs are provided on the connecting links. Because of the arrangement of parts in the bit-carrying assembly, the gibs or flanges 15 may be made of sufficient length to insure proper engagement of the cutter chain with the cutter bar or frame.

As shown, each of the connecting links, adjacent its eye 11, is cut back to inclined shoulder 16, and the bottom region of each of the side straps is cut back to shoulders 17, to permit turning movement between the bit-carrying assembly and the connecting links.

It will be seen that the wear incident to driving the chain is on the end faces of the side straps, which present a smooth rounded surface capable of sustaining the wearing effect of the sprocket teeth throughout a long period of service. The side straps and the bit-block being firmly bound together by an interlocking engagement, the driving stresses are distributed uniformly, and there is no substantial tendency to shear rivet 8.

The most important advantage of my structure is, however, the use of strong and wear-resisting pins for the pivotal interconnection of the connecting links and the bit-carrying assembly. As indicated above, this is made possible by confining the pins within chambers formed by the matching of two individual and co-operating side straps, without the necessity for connecting this pivot member in the bit-carrying assembly by upsetting, or by attachment other than its confinement within the chamber provided.

It will be noted that my cutter chain is not varied widely in its appearance and general conformation from the appearance and general conformation of cutter chains of standard form. The advantages of the chain are obtained without the use of complex elements such as are difficult to machine, and the arrangement and interconnection of the parts in the bit-carrying assembly are such as to provide a sturdy and practical structure.

My preferred side strap and pin structure has been shown in Figures I to VII inclusive of the drawings. Figure IX of the drawings illustrates a possible modification in the structure so shown. In this modification, also, each of the side straps 18 is an individual member formed to interlock with the bit-block 19 of the assembly, which is identical with bit-block 1. A similarly taken cross-section through the modified structure would therefore be identical with the showing of Figure VII.

Figure IX being taken on a section line equivalent to the section line VI—VI, illustrates a modification in the positioning and securing of a pivot pin by the side straps. In this modification, the side straps 18 may be provided with matching perforations 20, instead of the matching recesses which, in the structure of Figure VI, provide the chambers 9. The pin 21 has a central portion 21a of greater diameter than its end portions 21b. This forms on the pin shoulders 22 which abut the inner face of the side straps, adjacent the perforations 20. When assembly is made, the pin 21 is thus locked between side straps 18 by abutment of the side straps with shoulders 20. Pin 21 can be removed from its mounted position only by disassembly of the side straps.

Obviously, if it should be for any reason desirable, one end of each of the side straps may be made in accordance with the showing of Figure VI, and the other end of each of the side straps in accordance with the showing of Figure IX. In such case a pin of appropriate form would, of course, be used at the several ends of the assembly.

I claim as my invention:

1. In a cutter chain the combination of a bit-carrying assembly comprising a bit block, individual side straps embracing the bit block, fastening means for interconnecting the bit block and the side straps, said side straps recessed adjacent the ends thereof to provide pin-confining chambers defined by the matching of recesses in the cooperating side straps; pins lying in said chambers, and connecting links adapted to enter terminally between the side straps and having eyes for receiving the pins so mounted in the bit-carrying assembly.

2. For inclusion in a cutter chain as an element thereof a bit-carrying assembly comprising a bit block, individual side straps embracing the bit block, and means for interconnecting the bit block and the side straps, said side straps recessed adjacent the ends thereof to provide pin confining chambers defined by the matching of recesses in the cooperating side straps.

3. For inclusion in a cutter chain as an element thereof a bit-carrying assembly comprising a bit block, individual side straps embracing the bit block and forming a three sided inclosure therefor, and a fastening member passing through and interconnecting the bit block and the two side straps in the longitudinally median region of the side straps, said side straps recessed adjacent the ends thereof to provide pin-confining chambers defined by the matching of recesses in the cooperating side straps.

4. For inclusion in a cutter chain as an element thereof a bit-carrying assembly comprising a bit block, individual side straps embracing the bit block, said bit block having an interlocking engagement with the side straps, and a fastening member passing through and interconnecting the bit block and the two side straps, said side straps recessed adjacent the ends thereof to provide pin-confining chambers defined by the matching of recesses in the cooperating side straps.

5. In a cutter chain the combination of a bit-carrying assembly comprising a bit block, individual side straps embracing the bit block and forming a three sided enclosure therefor, a fastening member passing through and interconnecting the bit block and the two side straps in the longitudinally median region of the side straps, said side straps recessed adjacent their ends to provide pin-confining chambers defined by the matching of recesses in the cooperating side straps; pins lying in said chambers, and connecting links adapted to enter terminally between the side straps and having therein eyes for receiving the pins so mounted in the bit-carrying assembly.

6. In a cutter chain the combination of a bit-carrying assembly comprising a bit block, individual side straps embracing the bit block, said bit block having an interlocking engagement with the side straps, and a fastening member passing through and interconnecting the bit block and the two side straps, said side straps recessed adjacent the ends thereof to provide pin-confining chambers defined by the matching of recesses in the cooperating side straps; pins lying in said chambers, and connecting links adapted to enter terminally between the side straps and having therein eyes for receiving the pins so mounted in the bit-carrying assembly.

7. In a cutter chain the combination of a bit-carrying assembly comprising a bit block, individual side straps embracing the bit block, fastening means for interconnecting the bit block and the side straps, said side straps formed adjacent their ends to receive and position a connecting pin between the two co-operating side straps, pins embraced and positioned by said co-operating side straps; and connecting links adapted to enter terminally between the side straps and having eyes for receiving the connecting pins so mounted in the bit-carrying assembly.

8. For inclusion in a cutter chain as an element thereof a bit-carrying assembly comprising a bit block, individual side straps embracing the bit block, said side straps formed adjacent their ends to receive and position a connecting pin between the two co-operating side straps, means for interconnecting the bit block and the side straps, and connecting pins embraced and positioned by said co-operating side straps.

9. For inclusion in a cutter chain as an element thereof a bit-carrying assembly comprising a bit block, individual side straps embracing the bit block, said bit block having an interlocking engagement with the side straps, said side straps formed adjacent their ends to receive and position a connecting pin between the two adjacent side straps, a fastening member passing through and interconnecting the bit block and the two side straps, and connecting pins embraced and positioned by the two co-operating side straps.

10. For inclusion in a cutter chain the combination of a bit carrying assembly comprising a bit block and two side straps at least one of which side straps is removable from the remaining elements, a transverse locking member securing the side straps to each other, and connecting pins embraced and positioned by the side straps.

11. For inclusion in a cutter chain the combination of a bit carrying assembly comprising a bit block and two side straps, said side straps formed to provide a housing structure for connecting pins, with connecting pins confined and positioned wholly by abutment with the side straps.

ARTHUR L. LEE.